US008878960B2

(12) United States Patent
Watazawa

(10) Patent No.: US 8,878,960 B2
(45) Date of Patent: *Nov. 4, 2014

(54) IMAGE PROCESSING APPARATUS AND IMAGE MANAGEMENT METHOD

(71) Applicant: Canon Kabushiki Kaisha, Tokyo (JP)

(72) Inventor: Naoko Watazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/774,208

(22) Filed: Feb. 22, 2013

(65) Prior Publication Data

US 2013/0170704 A1 Jul. 4, 2013

Related U.S. Application Data

(63) Continuation of application No. 12/759,401, filed on Apr. 13, 2010, now Pat. No. 8,400,525.

(30) Foreign Application Priority Data

May 1, 2009 (JP) ................................. 2009-112295
Mar. 16, 2010 (JP) ................................. 2010-059929

(51) Int. Cl.

| H04N 7/00 | (2011.01) |
| H04N 7/18 | (2006.01) |
| H04N 5/76 | (2006.01) |
| H04N 5/77 | (2006.01) |
| G06K 9/00 | (2006.01) |
| H04N 9/82 | (2006.01) |
| H04N 9/804 | (2006.01) |
| H04N 5/907 | (2006.01) |

(52) U.S. Cl.

CPC .......... *G06K 9/00624* (2013.01); *H04N 9/8205* (2013.01); *H04N 9/8047* (2013.01); *H04N 5/772* (2013.01); *H04N 5/907* (2013.01)

USPC ................... 348/231.3; 348/116; 348/231.2; 348/231.5

(58) Field of Classification Search

USPC .............. 348/113, 116, 231.99–231.3, 231.5; 382/305

See application file for complete search history.

(56) References Cited

U.S. PATENT DOCUMENTS

| 6,437,797 | B1 * | 8/2002 | Ota ................................ 345/638 |
| 6,741,864 | B2 * | 5/2004 | Wilcock et al. ............. 455/456.1 |
| 6,819,356 | B1 * | 11/2004 | Yumoto ..................... 348/231.2 |
| 7,006,131 | B2 * | 2/2006 | Noguchi et al. .......... 348/207.99 |
| 7,742,099 | B2 * | 6/2010 | Ueno et al. .................... 348/372 |
| 7,956,905 | B2 * | 6/2011 | Ono et al. .................. 348/231.5 |
| 7,990,455 | B2 * | 8/2011 | Iga ........................... 348/333.02 |
| 8,031,238 | B2 * | 10/2011 | Uchiyama et al. ......... 348/231.3 |
| 8,094,974 | B2 * | 1/2012 | Hisatomi et al. ............. 382/306 |
| 8,400,525 | B2 * | 3/2013 | Watazawa .................. 348/231.3 |

* cited by examiner

*Primary Examiner* — Daniel M Pasiewicz
(74) *Attorney, Agent, or Firm* — Cowan, Liebowitz & Latman, P.C.

(57) ABSTRACT

Provided is an image processing apparatus comprising: an acquisition unit that acquires location information indicating a photographed point and date/time information indicating a photographed date/time for each of a plurality of images representing image data obtained by photographing; a determination unit that determines whether the photographed point of each image is a main photographed point or a sub-photographed point on the basis of the location information and the date/time information; and a recording unit that, if the photographed point of the image is the main photographed point, records information indicating the location of the main photographed point in association with the image data of the image, and that, if the photographed point of the image is the sub-photographed point, records information indicating the locations of the sub-photographed point and of the main photographed point in association with the image data of the image.

28 Claims, 13 Drawing Sheets

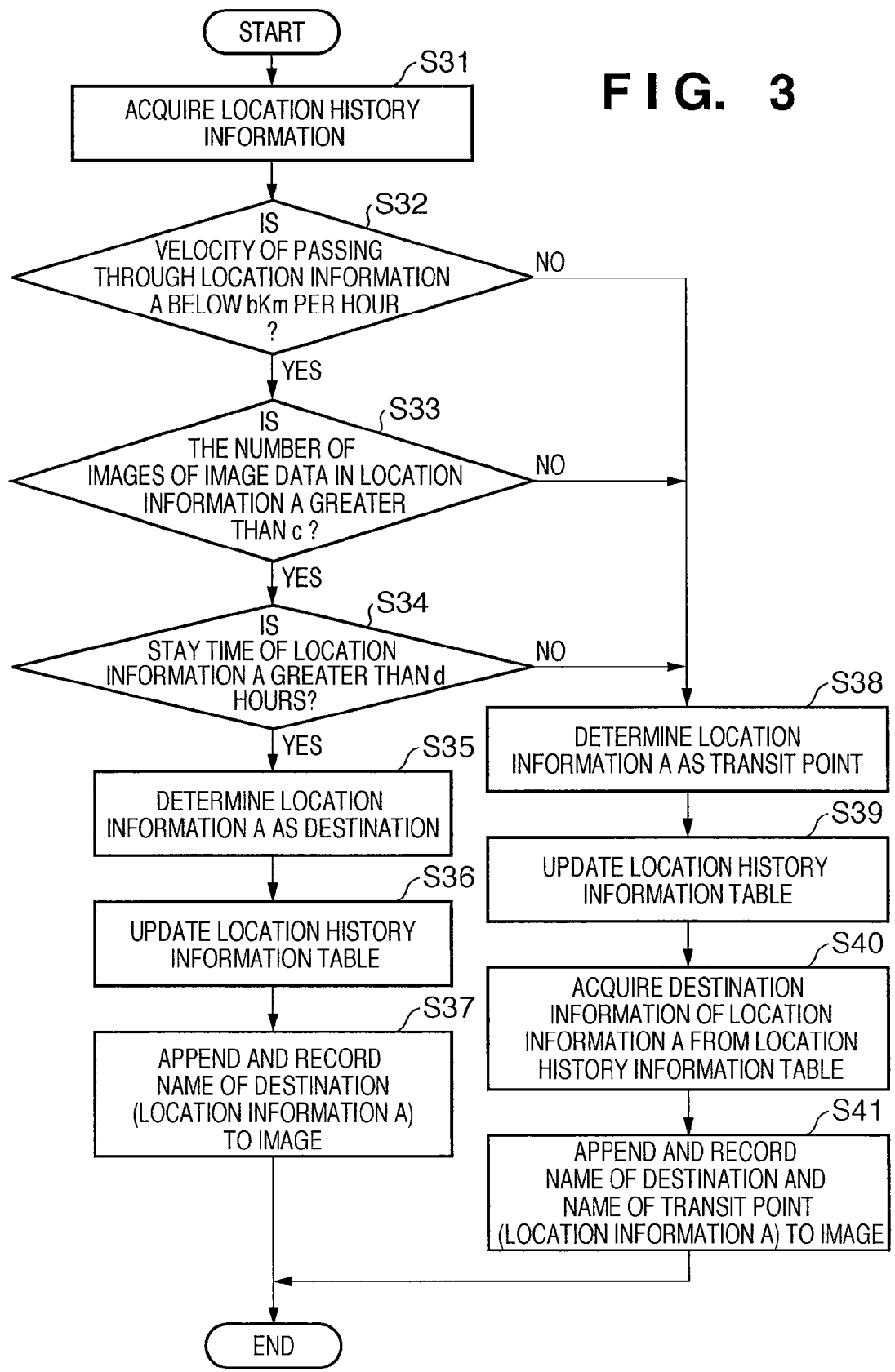

FIG. 4

| AREA | COUNTRY NAME | PREFECTURE NAME | CITY NAME | WARD NAME | TOWN NAME | LANDMARK |
|---|---|---|---|---|---|---|
| ASIA | JAPAN | KANAGAWA | YOKOHAMA | NISHI | MINATO MIRAI | LANDMARK TOWER |
| • | • | TOKYO | • | MINATO | SHIBA PARK | TOKYO TOWER |
| • | • | CHIBA | NARITA | • | IN NARITA AIRPORT | NARITA AIRPORT |
| • | • | • | • | • | • | • |
| • | • | • | • | • | • | • |
| • | • | • | • | • | • | • |
| EUROPE | FRANCE | • | PARIS | • | • | EIFFEL TOWER |
| • | • | • | • | • | • | • |
| • | • | • | • | • | • | • |
| • | • | • | • | • | • | • |
| • | UNITED KINGDOM | • | LONDON | • | • | BRITISH MUSEUM |
| • | • | • | • | • | • | • |
| • | • | • | • | • | • | • |

FIG. 5A

| IMAGE FILE NAME | DATE/TIME | LOCATION | DESTINATION/TRANSIT POINT | AREA NAME | COUNTRY NAME | PREFECTURE NAME | CITY NAME |
|---|---|---|---|---|---|---|---|
| 00001.jpeg | 2008/10/10 10:10 | (LONGITUDEa1, LATITUDEb1) | TRANSIT POINT | ASIA | JAPAN | KANAGAWA | YOKOHAMA |
| 00002.jpeg | 2008/10/10 10:12 | (LONGITUDEa2, LATITUDEb2) | TRANSIT POINT | ASIA | JAPAN | KANAGAWA | YOKOHAMA |
| 00003.jpeg | 2008/10/10 10:14 | (LONGITUDEa3, LATITUDEb3) | TRANSIT POINT | ASIA | JAPAN | KANAGAWA | YOKOHAMA |
| 00004.jpeg | 2008/10/10 10:16 | (LONGITUDEa4, LATITUDEb4) | TRANSIT POINT | ASIA | JAPAN | KANAGAWA | YOKOHAMA |
| • | • | • | • | • | • | • | • |
| • | • | • | • | • | • | • | • |
| 00030.jpeg | 2008/10/10 12:30 | (LONGITUDEa30, LATITUDEb30) | TRANSIT POINT | ASIA | JAPAN | CHIBA | NARITA |
| • | • | • | • | • | • | • | • |
| • | • | • | • | • | • | • | • |
| 00100.jpeg | 2008/10/12 10:00 | (LONGITUDEa100, LATITUDEb100) | DESTINATION | EUROPE | FRANCE | • | PARIS |
| 00101.jpeg | 2008/10/12 10:10 | (LONGITUDEa101, LATITUDEb101) | DESTINATION | EUROPE | FRANCE | • | PARIS |
| 00102.jpeg | 2008/10/12 11:00 | (LONGITUDEa102, LATITUDEb102) | DESTINATION | EUROPE | FRANCE | • | PARIS |
| • | • | • | • | • | • | • | • |
| • | • | • | • | • | • | • | • |

F I G. 5B

| WARD NAME | TOWN NAME | LANDMARK NAME | VELOCITY | DESTINATION COUNTRY NAME | DESTINATION CITY NAME | STAY TIME | NUMBER OF IMAGES |
|---|---|---|---|---|---|---|---|
| NISHI | MINATOMIRAI | YOKOHAMA-LAND MARK TOWER | 60Km/h | FRANCE | PARIS | 60 MIN | 5 |
| NISHI | MINATOMIRAI | · | 60Km/h | FRANCE | PARIS | 60 MIN | 5 |
| NISHI | MINATOMIRAI | · | 60Km/h | FRANCE | PARIS | 60 MIN | 5 |
| NISHI | MINATOMIRAI | · | 60Km/h | FRANCE | PARIS | · | · |
| · | · | · | · | FRANCE | PARIS | · | · |
| · | · | · | · | FRANCE | PARIS | · | · |
| · | IN NARITA AIRPORT | NARITA AIRPORT | 4Km/h | FRANCE | PARIS | 120 MIN | 2 |
| · | · | · | · | FRANCE | PARIS | · | · |
| · | · | · | · | FRANCE | PARIS | · | · |
| · | · | · | 3Km/h | FRANCE | PARIS | 5 DAYS | 100 |
| · | · | · | 2Km/h | FRANCE | PARIS | 5 DAYS | 100 |
| · | · | · | 2Km/h | FRANCE | PARIS | 5 DAYS | 100 |
| · | · | · | · | · | · | · | · |
| · | · | · | · | · | · | · | · |

F I G. 12

| IMAGE FILE NAME | DATE/TIME | LOCATION | VELOCITY | ALTITUDE |
|---|---|---|---|---|
| 00001.jpeg | 2008/10/10 10:10 | (LONGITUDEa1, LATITUDEb1) | PER HOUR 50Km | 500m |
| 00002.jpeg | 2008/10/10 10:12 | (LONGITUDEa2, LATITUDEb2) | PER HOUR 60Km | 500m |
| 00003.jpeg | 2008/10/10 10:14 | (LONGITUDEa3, LATITUDEb3) | PER HOUR 60Km | 500m |
| 00004.jpeg | 2008/10/10 10:16 | (LONGITUDEa4, LATITUDEb4) | PER HOUR 60Km | 500m |
| • | • | • | • | • |
| • | • | • | • | • |
| 00030.jpeg | 2008/10/10 12:30 | (LONGITUDEa30, LATITUDEb30) | PER HOUR 2Km | 700m |
| • | • | • | • | • |
| • | • | • | • | • |
| 00100.jpeg | 2008/10/12 10:00 | (LONGITUDEa100, LATITUDEb100) | PER HOUR 3Km | 1300m |
| 00101.jpeg | 2008/10/12 10:10 | (LONGITUDEa101, LATITUDEb101) | PER HOUR 4Km | 1300m |
| 00102.jpeg | 2008/10/12 11:00 | (LONGITUDEa102, LATITUDEb102) | PER HOUR 5Km | 1300m |
| • | • | • | • | • |
| • | • | • | • | • |

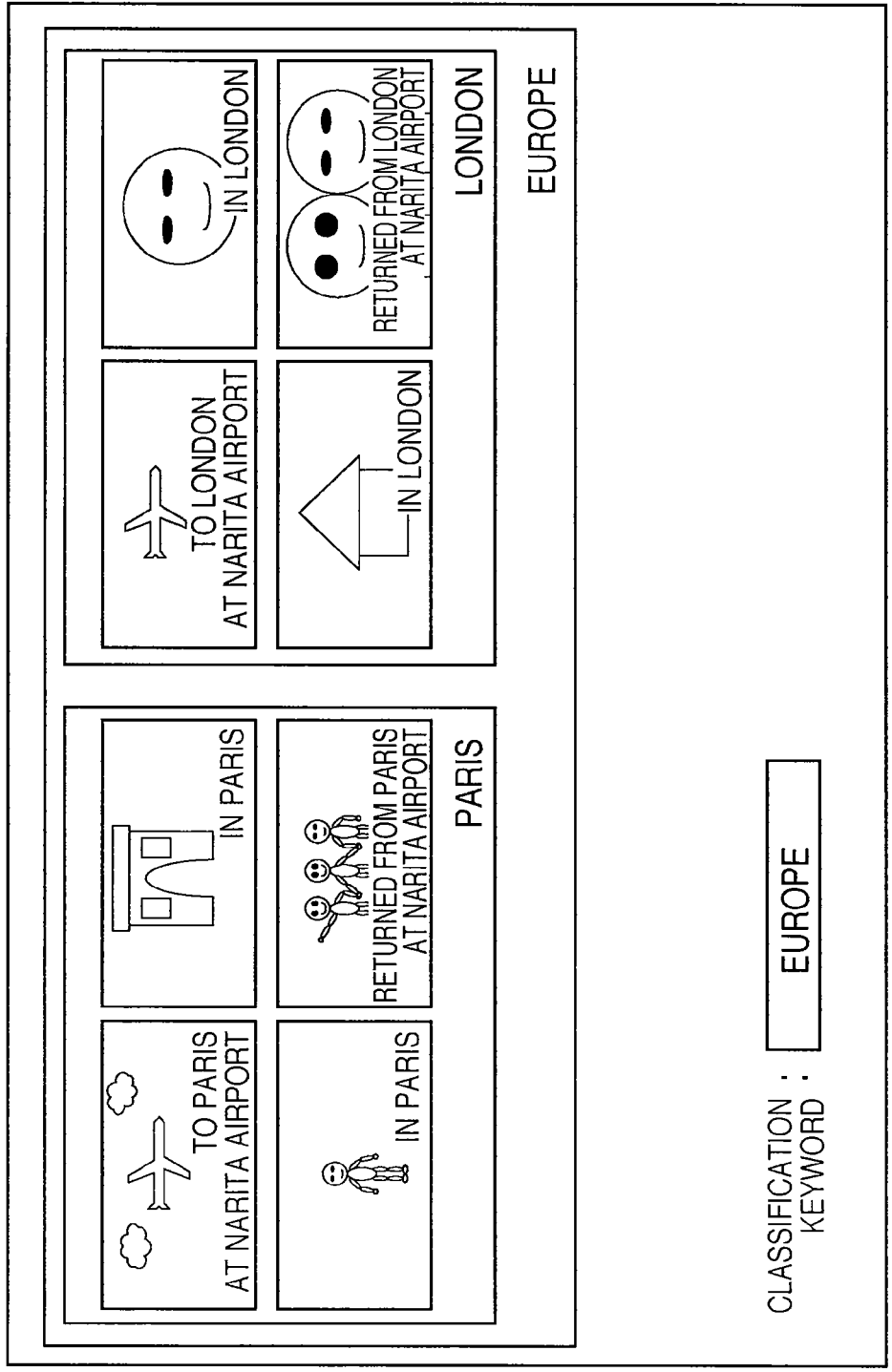

IMAGE PROCESSING APPARATUS AND IMAGE MANAGEMENT METHOD

CROSS-REFERENCE TO RELATED APPLICATIONS

This application is a continuation of application Ser. No. 12/759,401, filed Apr. 13, 2010 the entire disclosure of which is hereby incorporated by reference.

BACKGROUND OF THE INVENTION

1. Field of the Invention

The present invention relates to an image processing apparatus and an image management method for managing image data.

2. Description of the Related Art

In recent years, image sensing apparatuses, such as digital cameras and digital video cameras are widely used. The user can use the devices to take and record desired images. Furthermore, the prices of recording media for recording photographed images are reduced, and the capacities are higher. Therefore, a multiplicity of images can be easily recorded, and a large amount of image data is often stored.

Consequently, techniques for extracting and displaying desired images from a large amount of images recorded in a recording medium are proposed. As an example of a conventional image display method, there is a method of displaying images in order of photographing date/time and file name. To organize and display the images by the photographing locations, photographing location information needs to be appended to the images in advance, or a folder needs to be created for each photographing location before the user classifies the images into the folders.

Meanwhile, in recent years, an image sensing apparatus is produced, in which location information such as latitude and longitude can be acquired using a GPS (Global Positioning System). By taking images using such an image sensing apparatus, the user can check the location information of the photographed images.

Japanese Patent Laid-Open No. 2006-120058 discloses a method of reading GPS information and date/time information recorded with the images, referring to a database to acquire a relevant city name, and automatically classifying and displaying the images by the photographing locations without the user classifying the images into folders.

Japanese Patent Laid-Open No. 2006-279764 discloses an image recording reproducing apparatus having a function of automatically identifying and reproducing images taken in the past at the same location as the photographing location.

In this way, the user can easily check the locations where the images are taken by using the image sensing apparatus that can acquire the location information when taking images.

However, the aforementioned technique merely classifies the photographed images by the photographing locations based on the GPS information during photographing, and it is recognized that the photographing location is different every time the photographing location is changed. As a result, the images are classified into a multiplicity of photographing locations, and the viewability is reduced in some cases. For example, when the distance of travel to the destination is long in a trip, etc., and the user passes through one or a plurality of cities before arriving the destination, there is a problem that the photographs taken at the transit points and the destinations are classified into folders indicating different photographing locations.

SUMMARY OF THE INVENTION

The present invention has been made in consideration of the above situation, and classifies a large amount of image data in an easily understood manner so as to facilitate collective extraction of image data related to desired photographed points.

According to one aspect of the present invention, provided is an image processing apparatus comprising: an acquisition unit that acquires location information indicating a photographed point and date/time information indicating a photographed date/time for each of a plurality of images representing image data obtained by photographing; a determination unit that determines whether the photographed point of each image is a main photographed point that satisfies a plurality of preset conditions or a sub-photographed point that does not satisfy at least one of the plurality of preset conditions on the basis of the location information and the date/time information acquired by the acquisition unit; and a recording unit that, if the determination unit has determined that the photographed point of the image is the main photographed point, records information indicating the location of the main photographed point in association with the image data of the image in a recording medium, and that, if the determination unit has determined that the photographed point of the image is the sub-photographed point, records information indicating the location of the sub-photographed point and information indicating the location of the main photographed point in association with the image data of the image in the recording medium.

According to another aspect of the present invention, provided is an image management method comprising: an acquisition step of acquiring location information indicating a photographed point and date/time information indicating a photographed date/time for each of a plurality of images representing image data obtained by photographing; a determination step of determining whether the photographed point of each image is a main photographed point that satisfies a plurality of preset conditions or a sub-photographed point that does not satisfy at least one of the plurality of preset conditions on the basis of the location information and the date/time information acquired in the acquisition step; and a recording step of, if the photographed point is determined to be the main photographed point of the image in the determination step, records information indicating the location of the main photographed point in association with the image data of the image in a recording medium, and that, if the photographed point of the image is determined to be the sub-photographed point in the determination step, records information indicating the location of the sub-photographed point and information indicating the location of the main photographed point in association with the image data of the image in the recording medium.

Further features of the present invention will become apparent from the following description of exemplary embodiments (with reference to the attached drawings).

BRIEF DESCRIPTION OF THE DRAWINGS

FIG. 3 is a flow chart for explaining a determination and recording operation of appended destination/transit point information according to the first embodiment.

FIG. 4 is a diagram showing an example of an information table of a database according to the first embodiment.

FIGS. 5A and 5B are diagrams showing an example of a location history information table according to the first embodiment.

FIG. 12 is a diagram showing an example of an information table according to the fourth embodiment.

FIG. 13 is a diagram showing an example of image display according to the fourth embodiment.

DESCRIPTION OF THE EMBODIMENTS

Preferred embodiments of the present invention will be described in detail in accordance with the accompanying drawings.

First Embodiment

Figure 1:
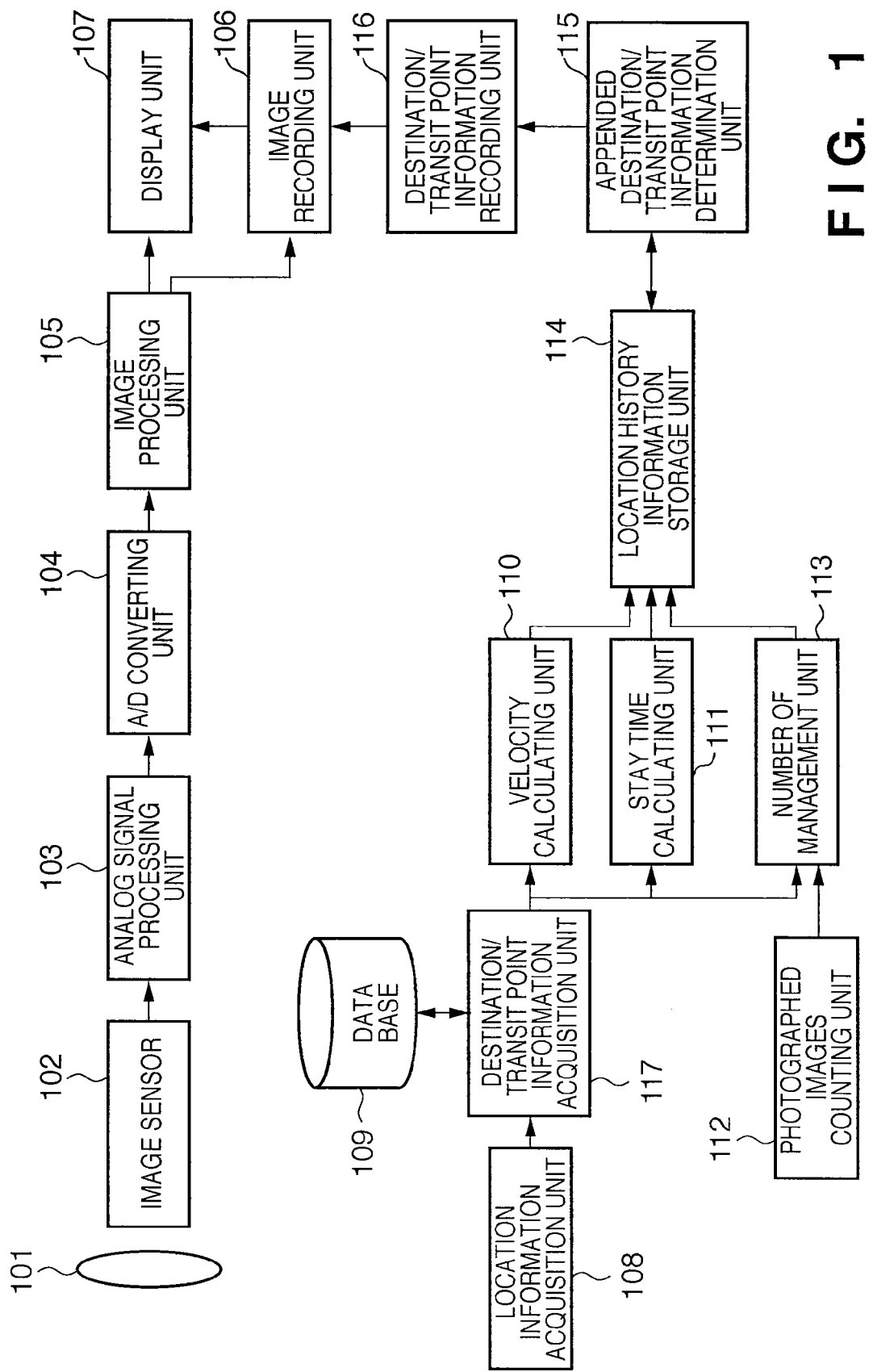
FIG. 1 is a block diagram showing a configuration of an image processing apparatus according to a first embodiment of the present invention.

FIG. 1 is a block diagram showing a configuration of a digital camera as an example of an image processing apparatus according to a first embodiment of the present invention. In FIG. 1, reference numeral 101 denotes a photographing lens for collecting light, and reference numeral 102 denotes an image sensor, such as a CCD or CMOS sensor, that converts light entered through the photographing lens 101 into an electrical signal corresponding to the intensity of the light and that outputs the signal pixel by pixel. Reference numeral 103 denotes an analog signal processing unit that applies analog signal processing to the electrical signal outputted from the image sensor 102, and reference numeral 104 denotes an A/D converting unit that converts an analog signal outputted from the analog signal processing unit 103 into a digital signal (image data).

Reference numeral 105 denotes an image processing unit that converts the image data into a data format for recording in an image recording unit 106. For example, if the recording medium of the image recording unit 106 is a flash memory, the image processing unit 105 converts the image data into a JPEG data format compliant with a standard of the flash memory. Reference numeral 107 denotes a display unit that displays images output from the image processing unit 105 or reproduced images based on image data recorded on the image recording unit 106.

Reference numeral 108 denotes a location information acquisition unit that acquires current location information and date/time information of the digital camera using the GPS, etc. An example of the location information includes positioning information of GPS (GPS information) indicating the latitude and the longitude, and an example of the date/time information includes information of date and time, such as 2008/10/10, 10:10. Reference numeral 117 denotes a destination/transit point information acquisition unit that acquires destination/transit point information from a database 109 based on the location information acquired by the location information acquisition unit 108. The database 109 holds an information table constituted by, for example, area name, country name, prefecture name, city name, ward name, town name, and landmark name, as shown in FIG. 4.

Reference numeral 110 denotes a velocity calculating unit that calculates a velocity from the location information and the date/time information acquired by the location information acquisition unit 108. Specifically, if the location information consecutively acquired by the location information acquisition unit 108 is location information A1, location information A2, location information A3, and so forth, date/time information B1, date/time information B2, date/time information B3, and so forth corresponding to the location information are acquired. Then the velocity calculating unit 110 divides a value of (A2−A1) indicating a distance of travel by a value of (B2−B1) indicating the time of travel to obtain the velocity.

Reference numeral 111 denotes a stay time calculating unit that calculates stay time from the location information and the date/time information acquired by the location information acquisition unit 108. Specifically, based on the destination/transit point information acquired by the destination/transit point information acquisition unit 117, the stay time calculating unit 111, for example, subtracts date/time information at the time of travel from a point A to a point B having destination/transit point information different from the point A from date/time information at the time of travel from the point B to a destination/transit point C having destination/transit point information different from the point B to obtain the stay time at the point B. As for the stay time, the stay time calculating unit 111 calculates the stay time for town name or landmark name, which is the minimum unit of the destination/transit point information of a location history information table held by a location history information storage unit 114. The location history information table will be described later.

Reference numeral 112 denotes a photographed images counting unit that counts the number of images taken by the digital camera. Reference numeral 113 denotes a number of images management unit that manages the number of images at each photographed point based on the location information acquired by the location information acquisition unit 108 and the number of images information counted by the photographed images counting unit 112.

Reference numeral 115 denotes an appended destination/transit point information determination unit that determines whether the point that the image is taken is a destination (main photographed point) or a transit point (sub-photographed point) based on the information of the location history information storage unit 114. Reference numeral 116 denotes a destination/transit point information recording unit that appends and records the information of the determination result determined by the appended destination/transit point information determination unit 115 to the image data, the information serving as information (metadata) associated with the image data.

Figure 2:
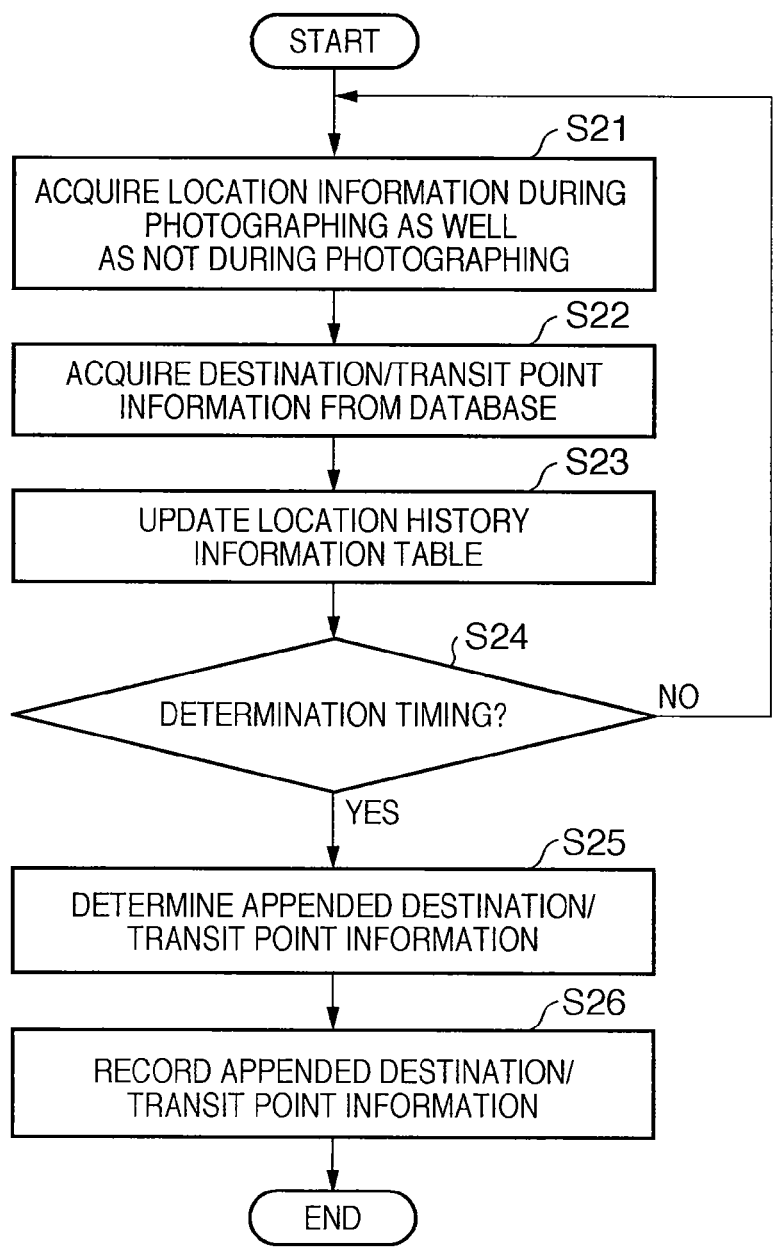
FIG. 2 is a flow chart for explaining an operation of the image processing apparatus according to the first embodiment.

An image management operation in the digital camera configured as shown in FIG. 1 will now be described with reference to the flow chart of FIG. 2.

The location information acquisition unit 108 first acquires the location information and the date/time information of the digital camera (step S21). The timing of acquisition is every arbitrarily set time unit, and for example, the location information acquisition unit 108 acquires the location information and the date/time information every minute during and not during photographing. The destination/transit point information acquisition unit 117 then acquires the city name and the country name from the database 109 based on the location information of the digital camera during photographing acquired by the location information acquisition unit 108 (step S22).

As described, the velocity calculating unit 110 acquires the velocity information, the stay time calculating unit 111 acquires the stay time information, and the number of images management unit 113 acquires the number of images information of each photographed point. The location history information storage unit 114 then updates the location history information table based on the obtained location information, date/time information, city name information, country name information, velocity information, stay time information, and the number of images information of each photographed point (step S23).

Subsequently, the appended destination/transit point information determination unit 115 determines whether it is the determination timing (step S24). Examples of the determination timing includes: when an image is not taken for a certain period of time; when a digital camera returns to a departure place after travel from the departure place to somewhere if the departure place is set; and when the digital camera is connected to a personal computer, etc. If the appended destination/transit point information determination unit 115 determines it is not the determination timing, the process returns to step S21.

On the other hand, if the appended destination/transit point information determination unit 115 determines that it is the determination timing, the appended destination/transit point information determination unit 115 determines appended destination/transit point information to be appended to the taken image (step S25). The determination algorithm will be described later. The destination/transit point information recording unit 116 then appends and records the determination result of the appended destination/transit point information determination unit 115 to the image as metadata (step S26). An example of the metadata includes EXIF information.

FIGS. 5A and 5B show an example of the location history information table stored in the location history information storage unit 114. The location history information table includes information of image file name, date/time, location, destination, transit point, area name, country name, prefecture name, city name, ward name, town name, landmark name, velocity, destination country name, destination city name, stay time, and the number of images. The location history information table is updated every time the location information acquisition unit 108 acquires the location information.

The operation by the appended destination/transit point information determination unit 115 to determine the appended destination/transit point information and the recording operation of the destination/transit point information recording unit 116 performed in step S25 will now be described with reference to the flow chart of FIG. 3. A case of determining the appended destination/transit point information of the photographed image data including the location information A will be described here.

The appended destination/transit point information determination unit 115 acquires the information shown in FIGS. 5A and 5B from the location history information table of the location history information storage unit 114 (step S31). The appended destination/transit point information determination unit 115 then determines whether the velocity of passing through the location information A is below the arbitrarily set bkm per hour (step S32). If the velocity is determined to be below bkm per hour, the process proceeds to step S33. If the velocity is not determined to be below bkm per hour, the process proceeds to step S38. In step S33, the appended destination/transit point information determination unit 115 determines whether the number of images of the image data in the location information A is greater than an arbitrarily set number of images c. If the number of images is determined to be greater than the number of images c, the process proceeds to step S34. If the number of images is not determined to be greater than the number of images c, the process proceeds to step S38. In step S34, the appended destination/transit point information determination unit 115 determines whether the stay time of the location information A is greater than an arbitrarily set stay time d. If the stay time is determined to be greater than the stay time d, the process proceeds to step S35. If the stay time is not determined to be greater than the stay time d, the process proceeds to step S38.

If all conditions of steps S32 to S34 are satisfied, the appended destination/transit point information determination unit 115 determines the location information A as the destination (main photographed point) in step S35, and the location history information storage unit 114 updates the location history information table by setting the location information A as the destination (step S36). The destination/transit point information recording unit 116 further appends and records the information (name of destination) indicating the location of the location information A, which is the destination, to the image data as metadata (step S37).

On the other hand, if even one of the conditions of steps S32 to S34 is not satisfied, the appended destination/transit point information determination unit 115 determines the location information A as a transit point (sub-photographed point) (step S38). The location history information storage unit 114 then updates the location history information table by setting the location information A as a transit point (step S39). The destination/transit point information recording unit 116 further acquires the destination information of the location information A from the location history information table (step S40) and appends and records the information indicating the location of the location information A (name of transit point), which is the transit point, and the information indicating the location of the destination (name of destination) to the image data as metadata (step S41). The metadata recorded this way is used to compare the date/time information of the image data determined as the destination and the date/time information of the image data determined as the transit point. This allows determining whether the image data of the transit point is photographed on the way to the destination or on the way back from the destination.

Figure 6A:
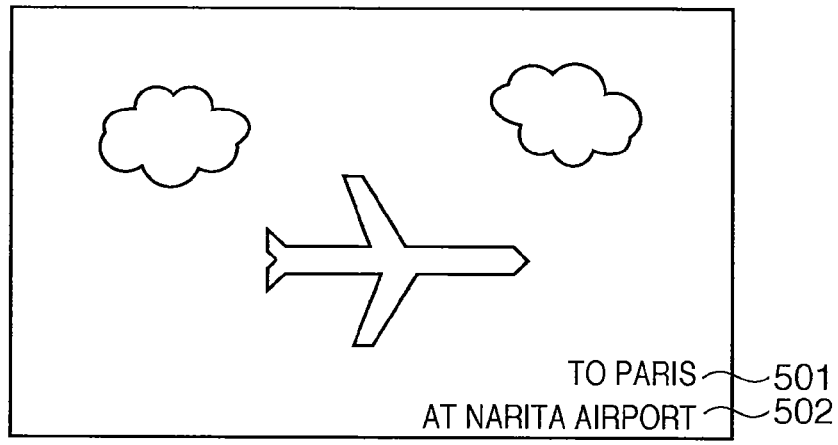
FIGS. 6A to 6C are diagrams showing an example of image display according to the first embodiment.
Figure 6B:
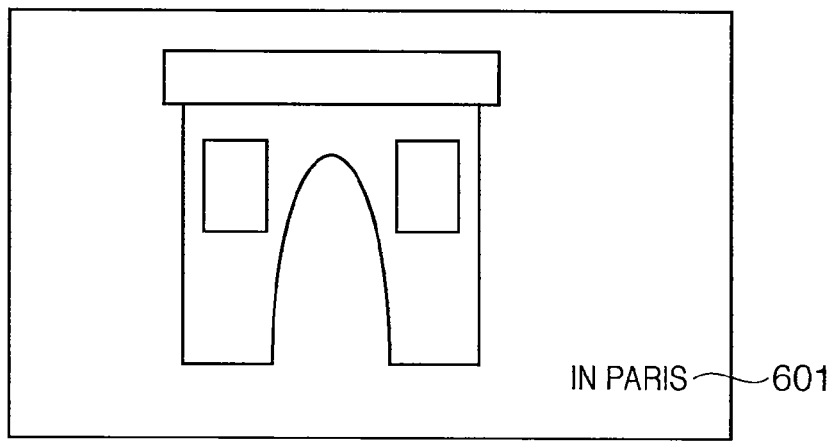
Figure 6C:
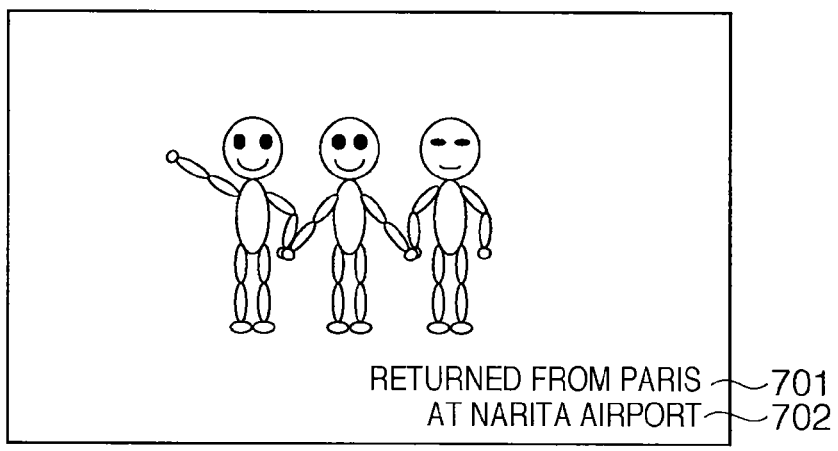

An example of a display is illustrated in FIGS. 6A to 6C, in which images taken by the digital camera and recorded in the recording medium are reproduced and displayed by the display unit 107. In the example here, the user departs from Japan and travels to Paris.

FIG. 6A shows an example of a displayed image, taken at Narita Airport in Japan on the way to Paris, where the destination is displayed as Paris, and the transit point as Narita Airport. Superimposing "To Paris" (501) and "At Narita Airport" (502) on the image allows the user to easily identify that the image is taken at Narita Airport before heading to the trip to Paris. FIG. 6B shows an example of displaying "In Paris" (601), Paris being the destination, in an image taken during stay in Paris. FIG. 6C shows an example of a displayed image, taken at Narita Airport on the way back from Paris, where the destination is displayed as Paris and Narita Airport as the transit point. Superimposing "Returned from Paris" (701) and "At Narita Airport" (702) allows the user to easily identify that the image is taken at Narita Airport on the way back from the trip to Paris.

As described, according to the first embodiment, not only can the photographing location of the photographed image be recognized, but also information of whether the photographing location is a destination, a transit point on the way to the destination, or a transit point on the way back to home from the destination can be easily recognized.

If the photographing location is a transit point, the destination information is appended and recorded to the image as metadata. As a result, the user can easily extract entire images related to a desired photographed point from a large amount of image data.

Although the velocity calculating unit 110 that calculates the velocity is provided in the first embodiment, the location information acquisition unit 108 can acquire the velocity information along with the latitude/longitude information and the date/time information. In that case, the location information acquisition unit 108 acquires the velocity information, and the location history information storage unit 114 stores the acquired information.

Although the location information acquisition unit 108 acquires the latitude/longitude information and the date/time information in the first embodiment, the altitude information can also be acquired along with the information. In that case, the location information acquisition unit 108 acquires the altitude information, and the location history information storage unit 114 stores the acquired information. For example, based on the location information and the altitude information, the appended destination/transit point information determination unit 115 can also determine that the user has used and traveled by airplane, etc. For example, if the location information acquisition unit 108 acquires the airport name as the location information of a transit point 1 and further acquires the airport name as the location information of a transit point 2 after the altitude information becomes high, the appended destination/transit point information determination unit 115 can determine that the travel between the airports is by airplane.

Second Embodiment

Figure 7:
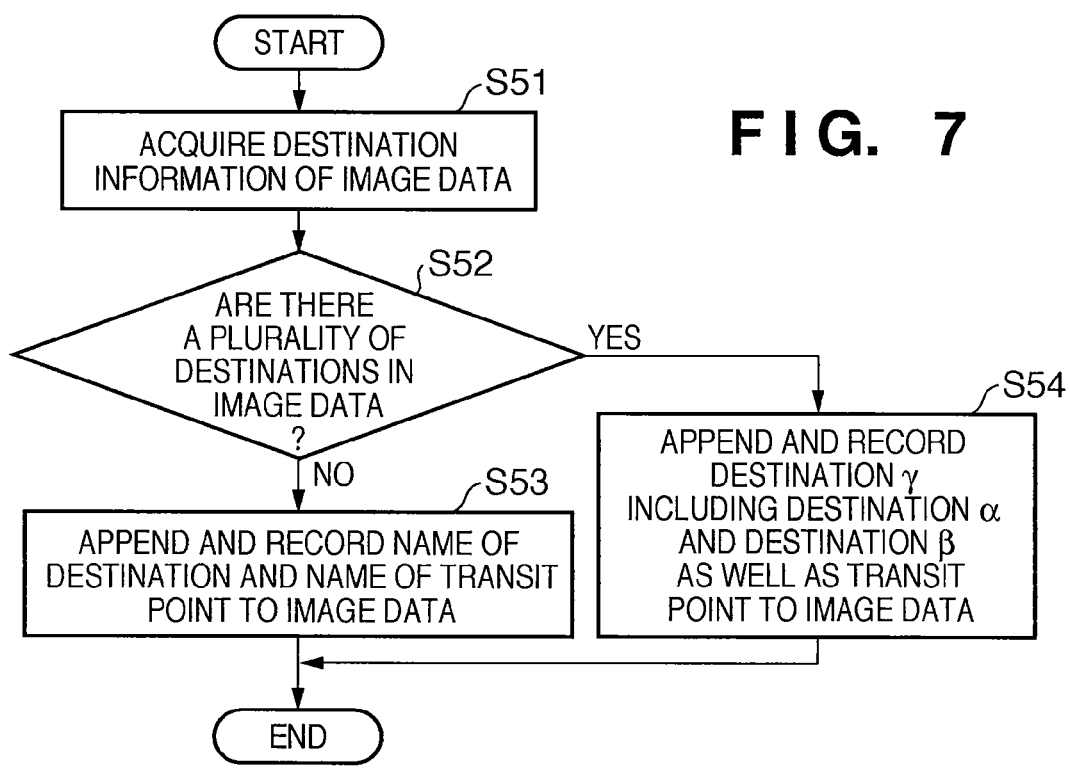
FIG. 7 is a flow chart for explaining a determination and recording operation of appended destination/transit point information according to a second embodiment of the present invention.

A second embodiment of the present invention will now be described. The digital camera shown in FIG. 1 serves as the image processing apparatus in the second embodiment too, and the description will not be repeated here. However, in the digital camera according to the second embodiment, the appended destination/transit point information determination unit 115 has a function of determining whether there are a plurality of destinations in the image data group stored in the location history information storage unit 114 of the first embodiment. The setting method of the destination information to be appended to the image is different from that in the first embodiment when it is determined that there are a plurality of destinations. Operations of the appended destination/transit point information determination unit 115 and the destination/transit point information recording unit 116 when the image data including the location information A determined as a transit location is inputted will be described with reference to the flow chart of FIG. 7.

The destination/transit point information recording unit 116 first acquires, from the location history information storage unit 114, the destination/transit point information of the destination of the image data determined by the appended destination/transit point information determination unit 115 to be a transit point (step S51) and determines whether there are a plurality of destinations in the image data (step S52). In the determination method of step S52, a location, in which the user has stayed longer than an arbitrary time ratio with respect to the total time of the entire image data group calculated from the data/time information of the image data group stored in the location history information storage unit 114, is determined as a destination, and whether there are a plurality of destinations that the user has stayed longer is determined. For example, if the total time of the data/time information of the image data group is 100 hours, and the arbitrary time ratio is set to 30%, a destination/transit point in which the user has stayed for more than 30 hours is determined as a destination. If there are a plurality of destinations in which the user has stayed for more than 30 hours, it is determined that there are a plurality of destinations.

If the destination is singular, the destination/transit point information recording unit 116 appends and records the name of the destination of the image data and the name of the transit point, which is the location information A, to the image data as metadata (step S53).

Meanwhile, if there are a plurality of destinations, the appended destination/transit point information determination unit 115 sets a destination/transit point of an area including the plurality of destinations in the image data as a new destination and appends and records the set destination and the name of the transit point, which is the location information A, to the image data as metadata (step S54). For example, if information of destination α and destination β is included, the appended destination/transit point information determination unit 115 sets a new destination γ including the destination α and the destination β. Specifically, if the destination α is Paris and the destination β is Nice, the destination γ is set to France.

In this way, according to the digital camera of the second embodiment, if the user takes images of a plurality of cities as destinations, the setting of the destination is changed depending on whether the destination is singular or plural. Therefore, the user can easily classify the image data later.

Third Embodiment

Figure 8:
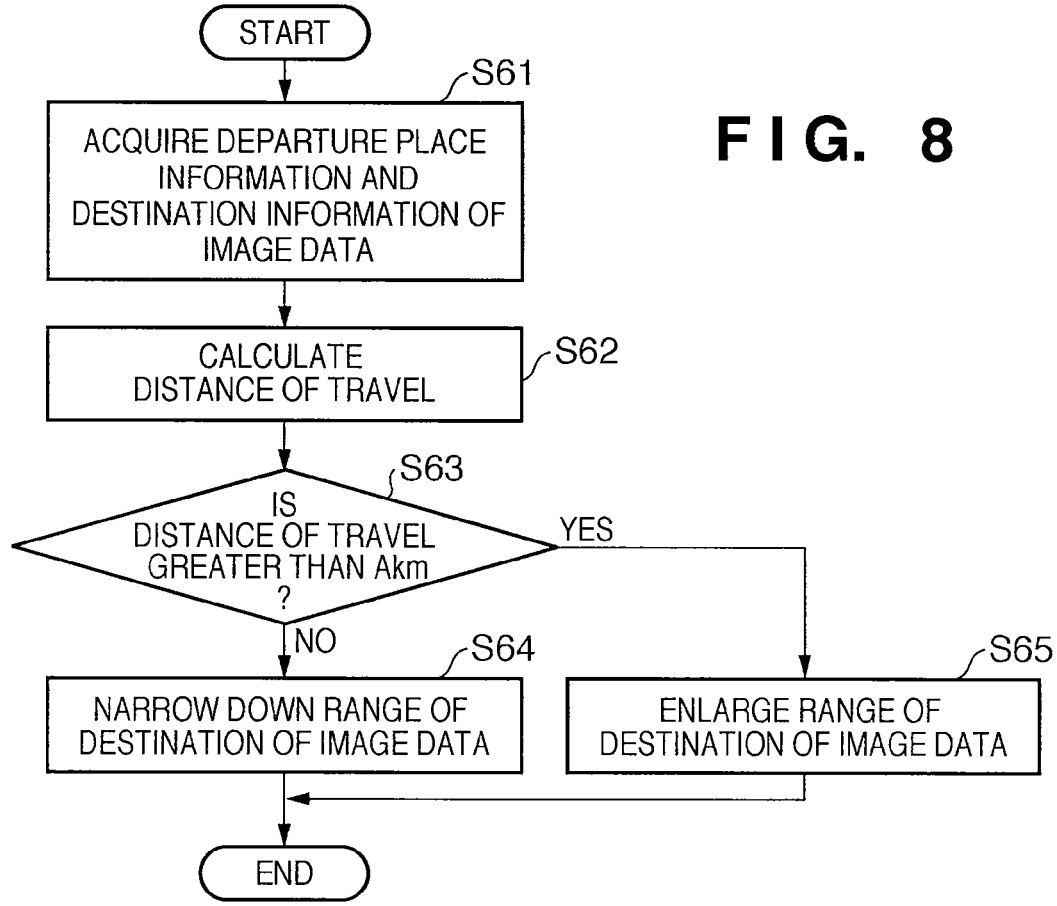
FIG. 8 is a flow chart for explaining a determination and recording operation of the appended destination/transit point information according to a third embodiment of the present invention.

A third embodiment of the present invention will now be described. The digital camera shown in FIG. 1 serves as the image processing apparatus in the third embodiment too, and the description will not be repeated here. However, the digital camera according to the third embodiment is different from the first embodiment in that the setting method of the range of the destination information appended to the image is changed in the appended destination/transit point information determination unit 115 in accordance with the distance of travel from the departure place to the destination. An operation of the appended destination/transit point information determination unit 115 when an operation unit not shown sets a departure place (reference place) will now be described with reference to the flow chart of FIG. 8.

The appended destination/transit point information determination unit 115 first acquires departure place information and the destination information of the image data from the location history information storage unit 114 (step S61). The appended destination/transit point information determination unit 115 calculates the distance of travel (step S62). The distance is obtained by subtracting the location information of the destination from the location information of the departure place acquired in step S61. The appended destination/transit point information determination unit 115 then determines whether the distance of travel calculated in step S62 is greater than an arbitrarily set distance of travel Akm (step S63). If the distance is not determined to be greater than Akm, the appended destination/transit point information determination unit 115 narrows down the range of the destination of the image data (step S64). For example, if A=3 km is set, and the distance of travel is 2 km, the appended destination/transit point information determination unit 115 classifies the image data in accordance with the town name, for example, which is a narrow range.

On the other hand, if the distance of travel is determined to be greater than Akm in step S63, the appended destination/transit point information determination unit 115 enlarges the range of the destination of the image data (step S65). For example, if A=3 km is set, and the distance of travel is 20 km, the appended destination/transit point information determination unit 115 classifies the image data in accordance with the prefecture name, the country name, for example, which is a wide range.

In this way, the digital camera of the third embodiment changes the setting of the destination depending on whether the distance from the departure place to the destination is a long distance or a short distance. Therefore, the user can easily classify the image data later.

Although the case, in which the user sets the departure place by the operation unit not shown, has been described in the third embodiment, the present invention is not limited to this, and the departure place can be automatically determined. For example, the location where the user has stayed the longest since the purchase of the digital camera can be automatically determined as the departure place.

In the description of the first to third embodiments, the image processing apparatus is a digital camera, and the recording medium is a flash memory. However, the present invention is not limited to this, and for example, an apparatus, such as a digital video camera and a personal computer, that reproduces image data can be applied as the image processing apparatus. It is obvious that the recording medium can be any storage medium, such as a disk medium like DVD and Blu-ray or a hard disk drive, as long as the storage medium can store images.

Fourth Embodiment

A fourth embodiment of the present invention will now be described. The image processing apparatus in the fourth embodiment is different from that in the first to third embodiments in that the photographing unit is not included and that image data, to which the location information and the date/time information are appended, is inputted as metadata. In the fourth embodiment, an image reproducing apparatus will be described as an image display application program executed by a personal computer.

Figure 9:
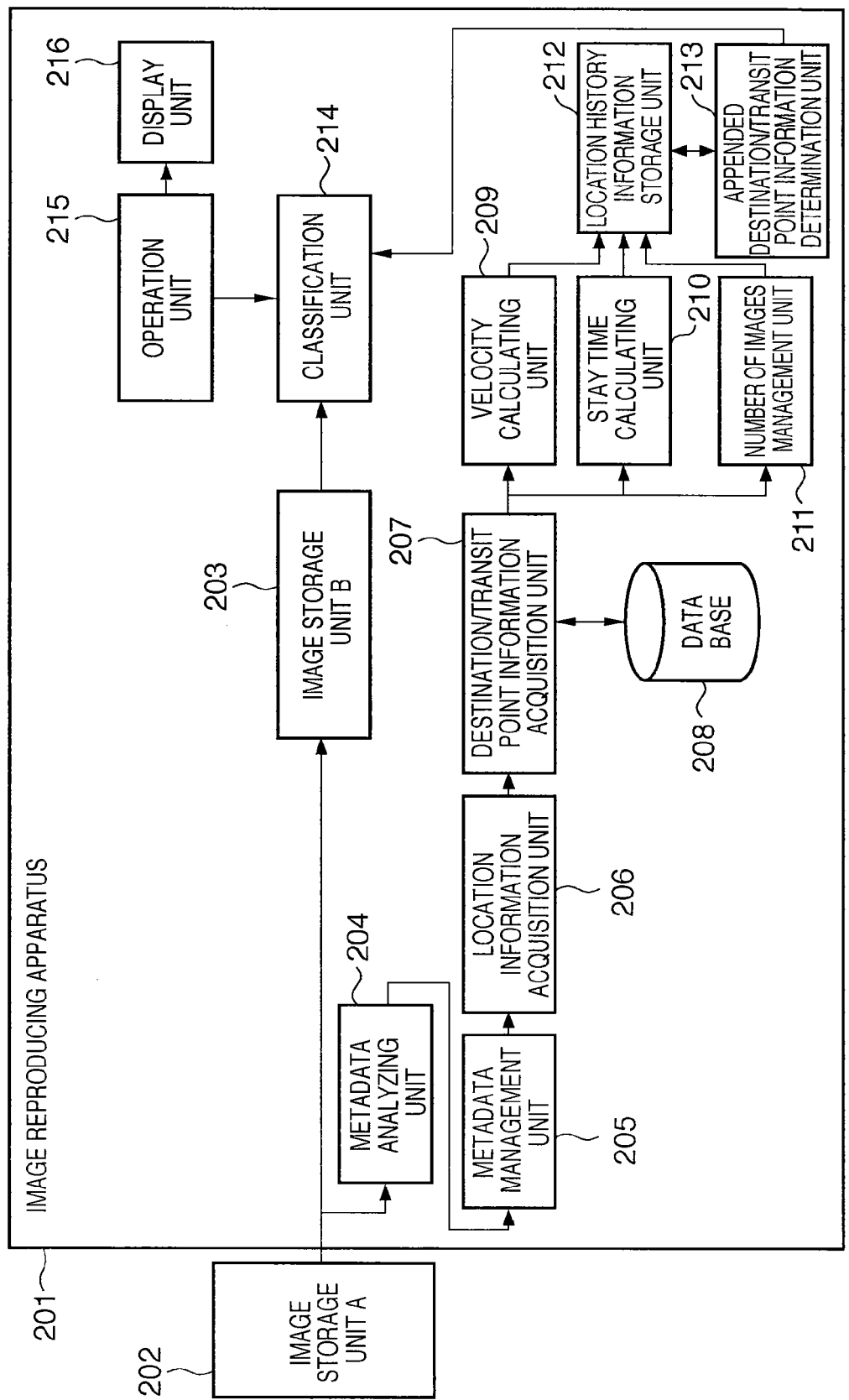
FIG. 9 is a block diagram showing a configuration of the image processing apparatus according to a fourth embodiment of the present invention.

FIG. 9 is a block diagram showing a configuration of an image reproducing apparatus 201 of the fourth embodiment. In FIG. 9, reference numeral 202 denotes an image storage unit A that stores a plurality of image data to which the location information and the date/time information are appended. Reference numeral 203 denotes an image storage unit B that stores a plurality of image data, to which the location information and the date/time information are appended, after converting the image data into a file format compliant with the recording medium.

Reference numeral 204 denotes a metadata analyzing unit that analyzes metadata appended to an image, and reference numeral 205 denotes a metadata management unit that manages information analyzed by the metadata analyzing unit 204 in an information table. FIG. 12 shows an example of the information table managed by the metadata management unit 205, and the table is constituted by information including image file name, date/time, location, velocity, and altitude. Reference numeral 206 denotes a location information acquisition unit that acquires the location information and the date/time information from the metadata management unit 205. Reference numeral 207 denotes a destination/transit point information acquisition unit that acquires destination/transit point information from a database 208 based on the location information acquired by the location information acquisition unit 206. The database 208 holds an information table constituted by, for example, area name, country name, prefecture name, city name, ward name, town name, and landmark name, as shown in FIG. 4.

Reference numeral 209 denotes a velocity calculating unit that calculates the velocity from the location information and the date/time information acquired by the location information acquisition unit 206, in the same way as the velocity calculating unit 110 of FIG. 1. Reference numeral 210 denotes a stay time calculating unit that calculates the stay time from the location information and the date/time information acquired by the location information acquisition unit 206, in the same way as the stay time calculating unit 111 of FIG. 1. However, the stay time in the fourth embodiment is calculated only from the metadata of the inputted image data, which is different from the case of the first embodiment in which the location information and the date/time information not during photographing can be acquired. Therefore, although the calculation accuracy of the stay time is lower than the velocity calculating unit 110, a large amount of image data can be automatically classified.

Reference numeral 211 denotes a number of images management unit that manages the number of images at each photographing point based on the location information acquired by the location information acquisition unit 206. Reference numeral 212 denotes a location history information storage unit that stores a location history information table. The location history information table is constituted by information including image file name, date/time, location, destination, transit point, area name, country name, prefecture name, city name, ward name, town name, landmark name, velocity, destination country name, destination city name, stay time, and the number of images. The location history information storage unit 212 stores a location history information table including the history of the information associated with the image file name of the image data inputted to the image storage unit B 203.

Reference numeral 213 denotes an appended destination/transit point information determination unit that determines whether the image is a destination or a transit point based on the information frothe location history information storage unit 212. Reference numeral 214 denotes a classification unit that classifies the image data based on the determination result determined by the appended destination/transit point information determination unit 213 and an operation request by an operation unit 215. The operation unit 215 is used by the user to instruct how to classify and display the images. For example, classifications by the photographing date/time, the city name, the destination, and the transit point are possible. The destinations can be classified into small pieces by the city name or can be classified into large pieces by the country name, Europe, etc. Reference numeral 216 denotes a display unit that displays the image data classified by the classification unit 214.

Figure 10:
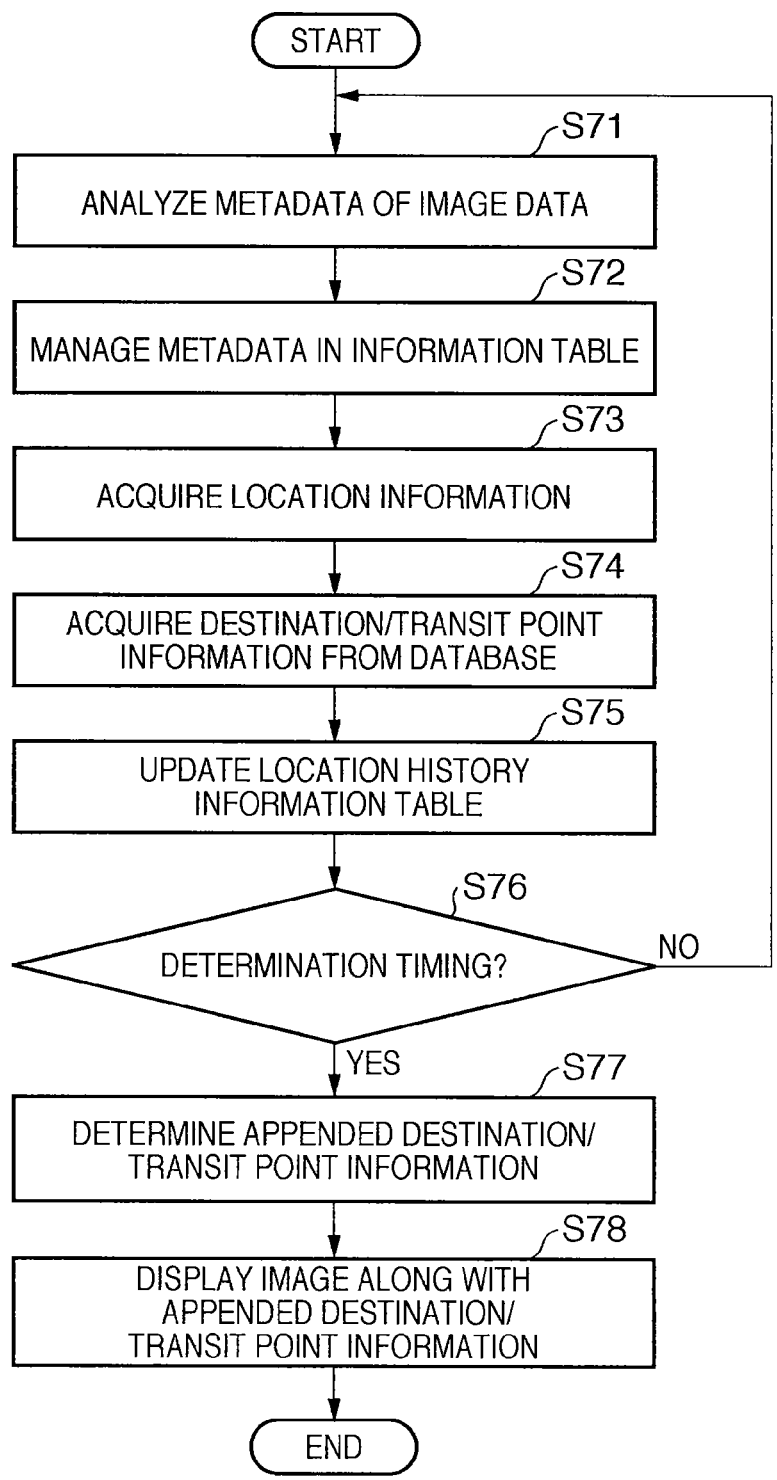
FIG. 10 is a flow chart for explaining an operation of an image display application according to the fourth embodiment.

An operation of the image reproducing apparatus configured as shown in FIG. 9 will now be described with reference to the flow chart of FIG. 10.

The metadata analyzing unit 204 first analyzes the metadata of the inputted image data (step S71), and the metadata management unit 205 manages the metadata analyzed by the metadata analyzing unit 204 in the information table (step S72). The location information acquisition unit 206 then acquires the location information and the date/time information from the metadata management unit 205 (step S73), and the destination/transit point information acquisition unit 207 acquires the city name and the country name from the database 208 based on the location information obtained from the location information acquisition unit 206 (step S74).

Subsequently, as described above, the velocity calculating unit 209 acquires the velocity information, the stay time calculating unit 210 acquires the stay time information, and the number of images management unit 211 acquires the number of images information of each photographing location. The location history information storage unit 212 then updates the location history information table based on the obtained location information, date/time information, city name information, country name information, velocity information, stay time information, and the number of images information of each photographing location (step S75). The location history information table is the same as the one described in the first embodiment with reference to FIGS. 5A and 5B.

The appended destination/transit point information determination unit 213 then determines whether it is the determination timing (step S76). Examples of the determination timing include when all image data in the image storage unit A 202 are inputted to the image reproducing apparatus 201 and when everything in one folder of image data in the image storage unit A 202 is inputted. If the appended destination/transit point information determination unit 213 determines that it is not the determination timing, the process returns to step S71.

On the other hand, if the appended destination/transit point information determination unit 213 determines that it is the determination timing, the appended destination/transit point information determination unit 213 determines the appended destination/transit point information of the image data (step S77). The determination algorithm will be described later. The classification unit 214 classifies the image data in accordance with an operation request by the operation unit 215 based on the determination result of the appended destination/transit point information determination unit 213, and the display unit 216 displays the destination/transit point information along with the image data (step S78).

Figure 11:
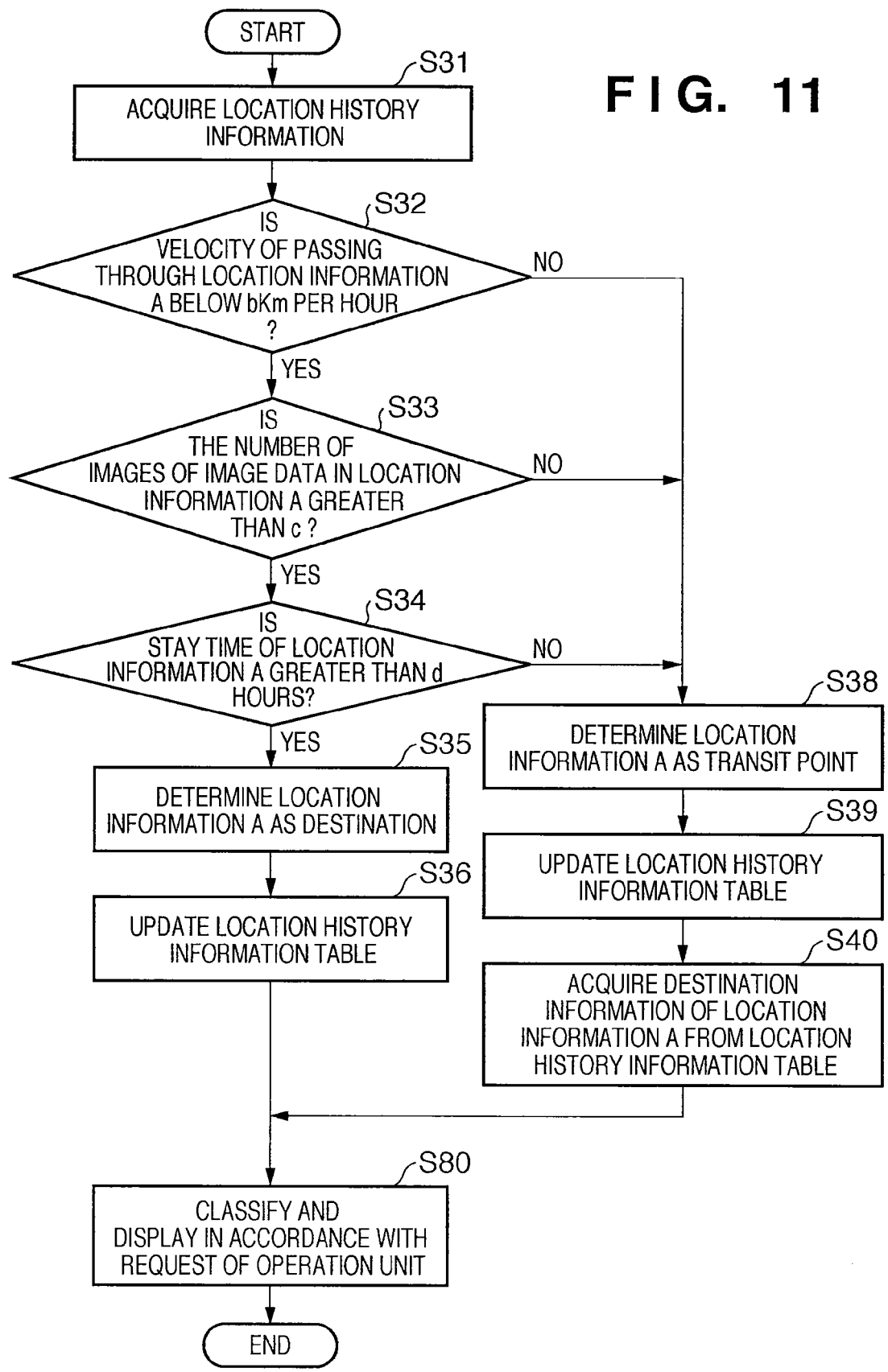
FIG. 11 is a flow chart for explaining a determination and classification operation of the appended destination/transit point information according to the fourth embodiment.

An operation by the appended destination/transit point information determination unit 213 to determine the appended destination/transit point information and a classification operation of the classification unit 214 performed in step S77 will now be described with reference to the flow chart of FIG. 11. A case of determining the appended destination/transit point information of the photographed image data including the location information A will be described here. The process shown in FIG. 11 is different from the process of the flow chart of FIG. 3 described in the first embodiment as follows. More specifically, in steps S37 and S41 of FIG. 3, the names of the destination and transit points are appended and recorded to the image data as metadata. Meanwhile, the fourth embodiment is different in that the destination/transit point information is not appended to the image data as metadata, and the names of the destination and transit points are only displayed on the display unit 216 along with the image data. Other processes are the same.

More specifically, if the location information A is set as the destination to update the location history information table in step S36, or if the location information A is set as the transit point to update the location history information table in step S39, the process proceeds to step S80. The classification unit 214 classifies the image data based on the determination result of the appended destination/transit point information determination unit 213 and an operation request of the operation unit 215, and the display unit 216 displays the names of the destination and transit points along with the images.

FIG. 13 is an example of display on the display unit 216. Europe is designated as a classification keyword in the operation unit 215 in the example of display. A trip to Paris and a trip to London as the destinations can be put together for classification, and the searchability is excellent.

According to the fourth embodiment, a multiplicity of image data taken by the digital camera can be automatically classified by the destinations, and an image reproducing apparatus with significantly excellent searchability can be provided.

In the description of the fourth embodiment, although the image reproducing apparatus is the image display application program of a personal computer, the arrangement is not limited to this. For example, it is obvious that the image reproducing apparatus can be applied to an apparatus, such as a digital camera and a cell phone, that reproduces image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-112295 filed on May 1, 2009 and No. 2010-059929 filed on Mar. 16, 2010, which are hereby incorporated by reference herein in their entirety.

What is claimed is:

1. An image processing apparatus comprising:
   a determination unit that determines whether location information corresponding to an image content indicates a destination or a transit point; and
   an output unit that outputs, to another device, information corresponding to the destination as associated information of the image content,
   wherein the output unit outputs, to the other device, information corresponding to the location information and the information corresponding to the destination as associated information of the image content if the location information corresponding to the image content indicates the transit point.

2. The image processing apparatus according to claim 1, further comprising:
   a display unit that displays information corresponding to the destination and an image corresponding to the image content;
   wherein the display unit displays the information corresponding to the destination, information corresponding to the transit point and an image corresponding to the image content if the location information corresponding to the image content indicates the transit point.

3. The image processing apparatus according to claim 1, wherein the output unit further outputs an image content.

4. The image processing apparatus according to claim 1, wherein the information corresponding to the image content is outputted as additional data of the image content.

5. The image processing apparatus according to claim 1, wherein the information corresponding to the image content is outputted as metadata of the image content.

6. The image processing apparatus according to claim 1, wherein the determination unit performs the determination in response to the image content being obtained.

7. The image processing apparatus according to claim 1, wherein the other device has a recording unit.

8. The image processing apparatus according to claim 1, wherein the other device has a display unit.

9. The image processing apparatus according to claim 1, further comprising:
a storage unit that stores data base relating to location;
wherein information corresponding to the transit point is determined by referring to the data base based on the location information.

10. The image processing apparatus according to claim 1, wherein the location information includes information corresponding to a latitude and a longitude.

11. The image processing apparatus according to claim 1, wherein the information corresponding to the destination indicates a name of the destination.

12. The image processing apparatus according to claim 2, wherein information corresponding to the transit point indicates a name of the transit point.

13. The image processing apparatus according to claim 1, further comprising:
an image capture unit configured to capture an image corresponding to the image content.

14. The image processing apparatus according to claim 1, wherein the image processing apparatus is configured to act as a digital camera.

15. An image processing apparatus comprising:
a determination unit that determines whether location information corresponding to an image content indicates a destination or a position on the way to the destination; and
an output unit that outputs, to another device, information corresponding to the destination as associated information of the image content,
wherein the output unit outputs, to the other device, information corresponding to the location information and the information corresponding to the destination as associated information of the image content if the location information corresponding to the image content indicates a position on the way to the destination.

16. An image processing apparatus comprising:
a determination unit that determines whether location information corresponding to an image content indicates a destination or a transit point; and
an output unit that outputs, to another device, associated information of the image content, the associated information including information corresponding to the destination;
wherein the associated information includes information corresponding to the transit point if the location information corresponding to the image content indicates the transit point.

17. A method comprising:
determining whether location information corresponding to an image content indicates a destination or a transit point;
outputting, to another device, information corresponding to the destination as associated information of the image content;
wherein information corresponding to the location information and the information corresponding to the destination as associated information of the image content are outputted to the other device, if the location information corresponding to the image content indicates the transit point.

18. A method comprising:
determining whether location information corresponding to an image content indicates a destination or a position on the way to a destination; and
outputting, to another device, information corresponding to the destination as associated information of the image content,
wherein information corresponding to the location information and the information corresponding to the destination as associated information of the image content are outputted to the other device, if the location information corresponding to the image content indicates a position on the way to the destination.

19. A method comprising:
determining whether location information corresponding to an image content indicates a destination or a transit point; and
outputting, to another device, associated information of the image content, the associated information including information corresponding to the destination;
wherein the associated information includes information corresponding to the transit point if the location information corresponding to the image content indicates the transit point.

20. A non-transitory storage medium in which is stored a computer-readable program for causing a computer to execute the method of claim 17.

21. A non-transitory storage medium in which is stored a computer-readable program for causing a computer to execute the method of claim 18.

22. A non-transitory storage medium in which is stored a computer-readable program for causing a computer to execute the method of claim 19.

23. The image processing apparatus according to claim 1, wherein the other device is not provided within a housing of the image processing apparatus.

24. The image processing apparatus according to claim 1, wherein the other device is wired to the image processing apparatus.

25. The image processing apparatus according to claim 1, wherein the other device is a display device.

26. The image processing apparatus according to claim 1, wherein the other device is a recording medium.

27. An image processing apparatus comprising:
a recording unit that records location information of a plurality of image contents;
a determination unit that determines whether location information corresponding to an image content among the plurality of image contents indicates a position that satisfies a predetermined condition of the location information of other image contents among the plurality of image contents; and
an output unit that outputs information corresponding to the position that satisfies the predetermined condition as associated information of the image content,
wherein the output unit outputs information corresponding to the location information and the information corresponding to the position that satisfies the predetermined condition as associated information of the image content if the location information does not indicate the position that satisfies the predetermined condition.

28. An image processing apparatus comprising:
a determination unit that determines whether location information corresponding to an image content indicates a destination or a transit point; and
a recording unit that records, on a recording medium, information corresponding to the destination as associated information of the image content,
wherein the recording unit records, on the recording medium, information corresponding to the location information and the information corresponding to the destination as associated information of the image content if the location information corresponding to the image content indicates the transit point.

* * * * *